Patented Jan. 7, 1936

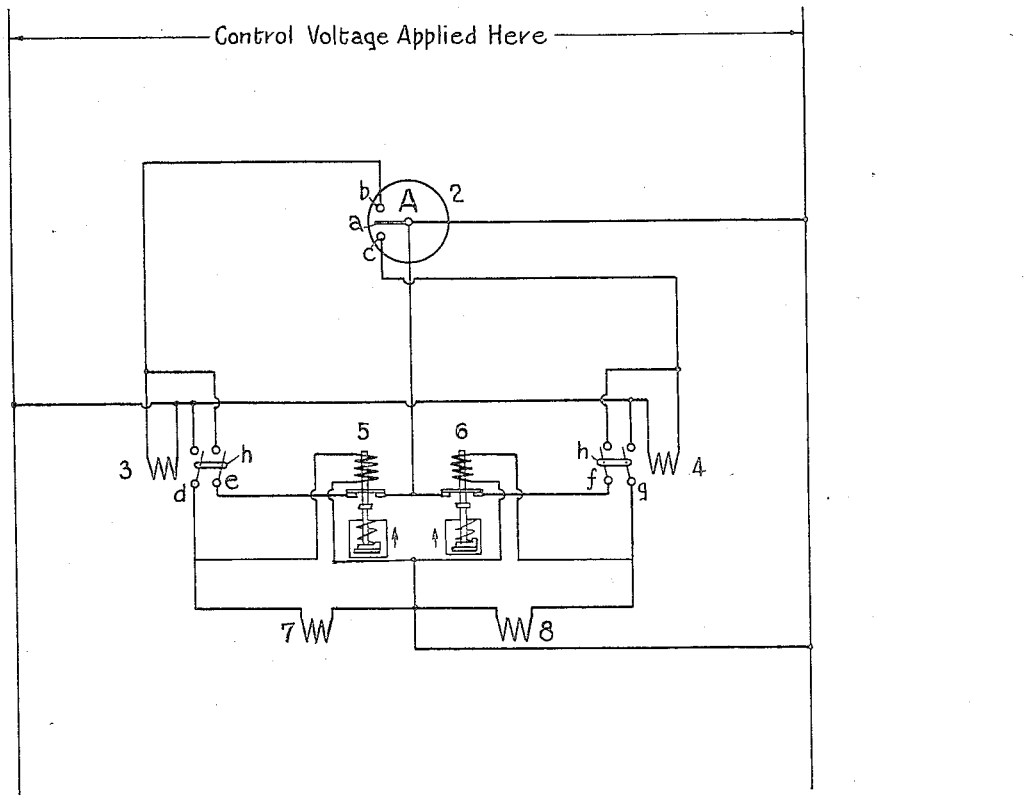

2,026,617

UNITED STATES PATENT OFFICE 2,026,617

MEANS FOR PREVENTING ARCING OF THE CONTACTS OF ELECTRICAL REGULATING INSTRUMENTS

Milton Eaton, Shawinigan Falls, Quebec, Canada

Application April 9, 1931, Serial No. 528,856

8 Claims. (Cl. 175—375)

This invention relates in general to improvements in electrical control apparatus and relates more particularly to apparatus adapted to effect floating or throttling control and to means for preventing the tendency to arcing between the contacts of electrical regulating instruments.

Electrical regulating instruments, such as contact making ammeters, current balance relays and contact making pressure gauges or pressure switches having movable contacts which move in response to changes in current or pressure, have an inherent tendency to arcing between the moving and the fixed contacts during the moment of establishing or breaking contact. This is due to the change in current or pressure, being as a rule very slow and somewhat pulsating. This arcing is not only injurious to the contacts of the regulating instruments, but is also indirectly responsible for damage to other control apparatus electrically interconnected therewith. For example, contactors controlled by such regulating instruments repeatedly open and close, or chatter, during this period of arcing. The contactors in turn transmit objectionable impulses to the motors or other apparatus which they control. If the contactors are employed to control motors, they repeatedly make and break the starting current and this performance results in burning of the contactors, sometimes causing them to adhere together or "freeze." The motors are also liable to become overheated incidental to taking the starting current for too long a period before being brought up to full speed.

The term "floating or throttling" is used to distinguish the apparatus of the present invention from the usual type of electric control apparatus which may be described as of the "on-off" type. In this latter type the controlled apparatus is set in operation by closure of a circuit through a regulating instrument such as a thermostat, a contact making pressure gauge or a contact making ammeter, and continues in operation until closure of a second circuit through the regulating instrument effects stoppage or reversal of the controlled apparatus. Such an arrangement is not satisfactory for many purposes as it results in constant hunting. An example of "on-off" control is the use of a compressor for maintaining pressure in a system between fixed limits determined by the high and low settings of a contact making pressure gauge. When the pressure falls, the moving contact of the gauge engages the low contact and initiates starting or speeding up of the compressor which continues in operation until increased pressure brings the moving contact into engagement with the high contact of the gauge and initiates stopping or slowing down of the compressor.

Regulation of this type is always excessive in one direction or the other and the controlled condition is always hunting. Such systems cannot maintain a desired condition constant but merely maintain it between two extremes.

According to this invention, a non-hunting control, which is termed a floating or throttling control, is provided. When the controlled condition causes engagement of the moving and fixed contacts of the regulating instrument, correction is effected only to such extent that the contacts are separated. If the controlled condition does not vary of itself, there is no regulating action and the condition is not forced to fluctuate between limits as is the case with "on-off" control systems. The correction afforded is never excessive and the condition is allowed to fluctuate according to circumstances between certain limits. The correction is only enough to cause fluctuation away from one limit and never enough to cause fluctuation to the other limit. In such a system the moving contact of the regulating instrument may hover very close to one or other of the fixed contacts so that there may be continuous or very frequent tendency to arcing with the attendant bad effects already pointed out.

The object of my present invention is to provide means whereby a floating or throttling, non-hunting control is effected and arcing at the contacts of the regulating instruments is avoided.

Broadly speaking, the invention resides in the combination of a contact making regulating instrument responsive to changes in the controlled condition; an induction actuated switching device of small current requirement controlling energization of a controlled element of greater current requirement, and a timing device such as an instantaneously resetting delay action relay; the said three elements being so related and connected that the switching device is controlled by the regulating instrument to close a holding circuit for itself and thereby to shunt the regulating instrument, said holding circuit including a contactor actuated by the delay action relay which relay is connected in parallel with the controlled element and receives current under control of the switching device and in turn operates to control the switching device during the shunted condition of the regulating instrument. The term "induction actuated switching device" is used as a generic term to indicate any suitable device, such as an electromagnetic switch, solenoid switch, relay or other device in which inductive force is converted into mechanical movement serving to operate a contactor.

An embodiment or commercial adaptation of my invention may include, in combination, an electrical regulating instrument including a normally fixed current contact and a movable current contact for contacting with said fixed contact; electrical control apparatus; time delay relay means in circuit with the said electrical control apparatus; and contactor means in circuit with said electrical regulating instrument and said time delay relay means, adapted to be energized upon passage of current between the said electrical regulating instrument contacts, to substantially instantaneously bridge current between said electrical regulating instrument contacts and effect energizing of said time delay relay means whereby current is delivered to said electrical control apparatus at substantially full voltage.

The drawing is a diagram symbolically depicting electrical instrumentalities and the wiring circuit therefor, such as may be used in carrying out the invention in practice.

The apparatus herein disclosed may be used to effect automatic control of electric furnaces, electric steam generators, air compressors, pumping stations and such like for maintaining a substantially constant condition of power input, steam pressure, air pressure, water pressure or the like.

A conventional electrical regulating instrument of the character referred to, for instance, a contact making ammeter, is symbolically depicted and generally designated at 2. The reference character $a$ designates the usual oscillatable contact movable in response to fluctuation in current or pressure, as the case may be, and $b$ and $c$ indicate fixed contacts, or contacts subject to manual adjustment or setting. In instruments of this class, the setting of the contacts $b$ and $c$ determines the limits between which the controlled current input or pressure may vary before the control apparatus functions to restore a normal condition of current input, or pressure, or such like. Such normal condition exists when the movable contact $a$ is floating between the aforesaid fixed contacts $b$ and $c$.

The numerals 3 and 4 generally indicate double pole induction actuated contactors. The pairs of contacts $d$ and $e$ and $f$ and $g$ of each contactor are interconnected or linked together as at $h$ by insulated means, so that they close simultaneously when the windings of the said contactors are energized. Tuning devices such as instantaneously resetting time delay relays are generally designated at 5 and 6 and have pairs of normally closed contacts $k$ and $l$, connected in series with the contacts $e$ and $f$, respectively and the windings of the contactors 3 and 4. The numerals 7 and 8 generally indicate the windings of electrical control apparatus such as directional contactors or the windings of motors and are connected in series with the contacts $d$ and $g$ of the contactors 3 and 4. The windings of the time delay relays 5 and 6 are connected, in parallel with the means 7 and 8, to the contacts $d$ and $g$ of the contactors 3 and 4.

A timing relay suitable for use in this invention is the pendulum type instantaneously resetting timing relay manufactured and sold by General Electric Company, but other types of timing devices may be used.

The electrical regulating instrument 2, the contactors 3 and 4, the time delay relays 5 and 6, and the electrical control apparatus indicated at 7 and 8 are wired in circuit for operation in the manner hereinafter disclosed, and as clearly depicted in the accompanying wiring diagram.

For the purpose of this description, let it be assumed that the numeral 2 indicates a contact making ammeter responsive to variations in the current taken by one electrode of an electric furnace. In order to increase the current taken by such an electrode, it must be lowered into the furnace charge. The current input is decreased by raising the electrode. Furthermore, let it be assumed that the electrode is taking normal current but that conditions in the furnace are such that the current is slowly rising. If $b$ indicates the high current contact, movable contact $a$ will slowly move into contact with it. As soon as current passes between these contacts, the winding of the contactor 3 is energized, thereby causing its two pairs of contacts $d$ and $e$ to close. The contacts $e$ of contactor 3 and $k$ of time delay relay 5 at this moment complete a holding circuit for the contactor which circuit also bridges or shunts the contacts $a$ and $b$ of the electrical regulating instrument 2. This holding circuit holds the contactor 3 closed so that the arcing that might otherwise occur between the contacts $a$ and $b$ is avoided. In this embodiment, 7 represents the winding of the directional contactor controlling the electrode hoist motor which in closing causes the motor to rotate in such wise that the electrode is raised. This winding 7 is energized on closing of the pair of contacts $d$ of the contactor 3.

The winding of the time delay relay 5 is connected in parallel with the winding 7, so that at the moment the directional contactor controlled by the winding 7 is closed the time delay relay 5 is energized. After the time setting of the time delay relay 5 has elapsed the normally closed pair of contacts $k$ open. If contact is broken between the contacts $a$ and $b$ of the electrical regulating instrument 2 at or before the instant the relay 5 opens the contacts $k$, the contactor 3 will reopen, thereby effecting de-energizing of the winding 7 and the time delay relay 5, which latter will immediately reset and close the contacts $k$. The directional contactor controlled by the winding 7 then reopens, causing the hoist motor to stop and the electrode to remain in the position to which it has been adjusted. The time setting of the time delay relay 5 must not be of sufficient duration to allow the electrode to be raised so far that the current falls sufficiently to carry the moving contact $a$ of the electrical regulating instrument 2 away from the contact $b$ thereof and into contact with the low current contact $c$ of the said instrument. Such condition would produce objectionable hunting. The proper time interval must not be less than is required to produce an appreciable movement of the electrode nor materially longer than is required under any condition to permit the contact $a$ to move away from the contact $b$ of the electrical regulating instrument 2.

If, after the contacts $k$ of the time delay relay 5 open, the contacts $a$ and $b$ of the electrical regulating instrument 2 remain engaged, the contactor 3 will be powered through the instrument 2 and, by holding the contacts $d$ closed, will maintain the relay 5 inoperative and the control apparatus 7 operative. The electrode will in consequence continue to rise until the current is so reduced that the contacts $a$ and $b$ of the electrical regulating instrument 2 cease to make effective contact. At this instant, contactor 3 will reopen, thereby effecting stopping of the hoist motor and de-energizing the winding of relay 5, thereby allowing the relay to reset and close the contacts k as hereinbefore described. It is obvious that, if the moving contact a of the electrical regulating instrument 2 is not carried away from the fixed contact b thereof within the time period determined by the time delay relay 5, the relay will be reset as soon as there is any tendency to arcing between the contacts a and b and will both hold the circuit of the contactor 3 and short circuit the contacts a and b for a definite time period, so that arcing between a and b due to imperfect contact will be positively prevented and the directional contactor 7 will be closed for the same definite time period. If during the second or any subsequent timing, the moving contact a has not been moved definitely out of circuit closing relation to the contact b, the relay will reset upon tendency to arcing between a and b and will repeat its timing action. The operation just described absolutely prevents chattering of the contactors 3 and 7 and thereby prevents the well known resultant detrimental effects in controlled motors or other apparatus. Instead of the motor circuits being made and broken several times per second, as when chattering occurs, the time period between make and break cannot be less than the time period predetermined by the relay 5.

The time delay relay 5 must be of a type that resets substantially instantaneously when de-energized, so that, should the contactor 3 open and reclose due to poor contact or to a make and break between the contacts a and b of the electrical regulating instrument 2, the contactor 3 is again held in the closed position for an appreciable period of time by the holding circuit established through the contacts k of the time delay relay 5.

If the reference character 8 indicates the winding of the directional contactor which on closing causes the hoist motor to rotate in such a direction that the electrode is lowered and the reference character c designates the low current contact of the instrument 2, the performance of the apparatus on closing of the contacts a and c will be similar to that hereinbefore described. The contactor 4 is closed and is in turn held in the closed position by the time delay relay 6 for the time period determined by the relay. This time delay relay 6 prevents arcing between the contacts a and c of the instrument 2 and consequent chattering of the contactor 4 in the same way that the time delay relay 5 prevents arcing between the contacts a and b of the electrical regulating instrument 2 and chattering of the contactor 3.

The current taken by the windings of directional contactors or the winding of motors controlled by regulating instruments of the class referred to is usually too heavy to be interrupted by the contacts of the electrical regulating instruments. To overcome this limitation, relay contactors such as the contacts 3 and 4 are used, the windings of which take comparatively little current.

While that embodiment of my invention herein disclosed has been described in conjunction with the regulating instrumentalities of electric furnaces, it will be understood this is for explanatory purposes only, and that the invention is not confined to the specific embodiment disclosed nor to the use indicated but extends to other embodiments and uses.

Having thus described my invention, what I claim is:—

1. In electrical control apparatus for effecting a floating or throttling, non-hunting control, the combination with a regulating instrument including fixed and moving contacts and with electrical apparatus controlled thereby and with primary means electrically connected between said elements to make and break the powering circuit of said controlled apparatus; of a timing device and a holding circuit for said primary means controlled by said timing device and adapted, upon closure of the circuit by said primary means, to shunt the regulating instrument contacts thereby to avoid arcing thereat when the moving contact is making imperfect contact with either of the fixed contacts and, through the instrumentality of said primary means, to hold the circuit through the controlled apparatus for a period of time determined by the timing device irrespective of the controlled condition and the resulting relation of the regulating instrument contacts.

2. In electrical control apparatus for effecting a floating or throttling, non-hunting control, the combination with a regulating instrument including fixed and moving contacts and with electrical apparatus controlled thereby and with primary means electrically connected between said elements to make and break the powering circuit of said controlled apparatus; of a timing device and a holding circuit for said primary means controlled by said timing device and adapted, upon closure of the circuit by said primary means, to shunt the regulating instrument contacts thereby to avoid arcing thereat when the moving contact is making imperfect contact with either of the fixed contacts and, through the instrumentality of said primary means, to hold the circuit through the controlled apparatus for a period of time determined by the timing device and normally sufficient to enable the moving contact to move out of arcing relation to the last engaged fixed contact.

3. In electrical control apparatus for effecting a floating or throttling, non-hunting control, the combination with a regulating instrument including fixed and moving contacts and with electrical apparatus controlled thereby and with primary means electrically connected between said elements to make and break the powering circuit of said controlled apparatus; of a timing device and a holding circuit for said primary means controlled by said timing device and adapted, upon closure of the circuit by said primary means, to shunt the regulating instrument contacts, thereby to avoid arcing thereat when the moving contact is making imperfect contact with either of the fixed contacts and, through the instrumentality of said primary means, to hold the circuit through the controlled apparatus for a period of time determined by the primary device and normally sufficient to produce corrective effect in the controlled condition without causing hunting.

4. In electrical control apparatus, means for effecting a floating or throttling, non-hunting control comprising in combination; a regulating instrument responsive to the controlled condition, including a pair of fixed contacts and a moving contact; a pair of electrically operated contactors controlling the circuits of condition governing means and connected in series with said moving contact and said fixed contacts, respectively; a holding circuit for each of said contactors arranged to shunt the related regulating instrument contacts; and a timing device for each of said holding circuits, a powering circuit for each timing device controlled by the related contactor whereby each timing device will be actuated upon closure of the related contactor, each said timing device being adapted to open the related holding circuit a predetermined time after closing thereof by the contactor, whereby correction of the controlled condition will be checked if the fixed and moving regulating instrument contacts are out of engagement and will be continued if the contacts are still in engagement.

5. In electrical control apparatus for effecting a floating or throttling, non-hunting control, the combination with a regulating instrument including fixed and moving contacts; a primary relay including a winding in series with said instrument contacts; a holding circuit for said primary relay adapted to be closed by the primary relay to shunt the instrument contacts; a timing relay having contacts included in said holding circuit and adapted to open said holding circuit a predetermined time after energization of said primary relay and an energizing circuit for said timing relay adapted to be closed by said primary relay simultaneously with closure of the holding circuit.

6. In electrical control apparatus for effecting a floating or throttling non-hunting control, the combination with a regulating instrument including fixed and moving contacts and with controlled apparatus and with a primary relay operatively connected between said instrument and said controlled apparatus, of a holding circuit for said primary relay adapted to be closed upon actuation of said primary relay; and an instantaneous resetting timing relay having contacts in said holding circuit adapted to maintain the holding circuit for a predetermined time after actuation of the primary relay, independently of effective contact between the instrument contacts, and adapted to thereafter maintain said holding circuit open as long as the primary relay continues to be energized through the instrument contacts.

7. In electrical control apparatus for effecting a floating or throttling, non-hunting control, the combination with a regulating instrument responsive to variations in a controlled condition, said instrument including fixed and moving contacts, and with condition regulating means and with a primary relay operatively connected between said regulating instrument and said regulating means; of a holding circuit for said primary relay adapted to be closed by the relay, a timing relay having contacts included in said holding circuit and a powering circuit for said timing relay independent of said holding circuit adapted to be closed by the primary relay upon actuation thereof.

8. In electrical apparatus for effecting a floating or throttling, non-hunting control, the combination with a regulating instrument responsive to variations in a controlled condition, said instrument including a pair of fixed contacts and a movable contact engageable with said fixed contacts separately; a pair of condition regulating means; primary relays operatively connected between the fixed contacts and the regulating means respectively; a holding circuit for each of said primary relays adapted to be closed upon actuation of the relay and to shunt the regulating instrument contacts; and timing relays having contacts in each of said holding circuits adapted to be powered upon actuation of the primary relay associated therewith through a circuit independent of the holding circuit, whereby each of said timing relays will maintain the holding circuit of the associated primary relay for a definite period of time independently of the regulating instrument contacts and will thereafter maintain the holding circuit open as long as the related fixed and moving contacts of the regulating instrument are in effective contact, said timing relays being instantaneously resetting upon deenergization of the primary relays thereby to restore the holding circuits at the timing relays.

MILTON EATON.